United States Patent
Schröter

Patent Number: 6,049,719
Date of Patent: *Apr. 11, 2000

[54] COMMUNICATION SYSTEM WITH AUTOMATIC CALL DIVERSION OR FORWARDING

[75] Inventor: Andreas Schröter, Nürnberg, Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/556,361

[22] Filed: Nov. 13, 1995

Related U.S. Application Data

[63] Continuation of application No. 08/556,361, Nov. 13, 1995.

[30] Foreign Application Priority Data

Nov. 12, 1994 [DE] Germany .............................. 44 40 500

[51] Int. Cl.[7] .................................................. H04Q 7/20
[52] U.S. Cl. .......................................... 455/462; 455/417
[58] Field of Search .............................. 379/61, 210, 211, 379/58; 455/462, 445, 417

[56] References Cited

U.S. PATENT DOCUMENTS

| | | | |
|---|---|---|---|
| 5,148,470 | 9/1992 | Kobayashi et al. | 379/58 |
| 5,233,644 | 8/1993 | Yamagata et al. | 379/61 |
| 5,365,573 | 11/1994 | Sakamoto et al. | 379/61 |
| 5,450,474 | 9/1995 | Hoflinger | 379/61 |
| 5,524,045 | 6/1996 | Yazawa | 379/58 |
| 5,732,355 | 3/1998 | Lipp et al. | 455/462 |

FOREIGN PATENT DOCUMENTS

| | | | |
|---|---|---|---|
| 0529721A2 | 3/1993 | European Pat. Off. | |
| 4207748A1 | 3/1992 | Germany | H04Q 7/20 |
| 02312493 | 12/1990 | Japan . | |
| 06133058 | 5/1994 | Japan . | |

*Primary Examiner*—Daniel S. Hunter
*Assistant Examiner*—Myron K. Wyche
*Attorney, Agent, or Firm*—Tony E. Piotrowski; Steven R. Biren

[57] ABSTRACT

A communication system includes a service switching point, a cordless terminal unit and a corded terminal unit. A call diversion or call forwarding from the corded to the cordless terminal unit is automatically activated when the cordless terminal unit is removed from a dedicated support.

7 Claims, 3 Drawing Sheets

COMMUNICATION SYSTEM WITH AUTOMATIC CALL DIVERSION OR FORWARDING

CROSS REFERENCE TO RELATED APPLICATIONS

This is a continuation of application Ser. No. 08/556,361, filed Nov. 13, 1995 patent pending.

BACKGROUND OF THE INVENTION

1. Field of the Invention

The invention relates to a communication system comprising a service switching point, a cordless terminal unit and a corded terminal unit.

2. Discussion of the Related Art

Such a communication system is known from DE 42 07 748 A1. It comprises a service switching point arranged as an ISDN private branch exchange to which a plurality of corded terminal units (telephones) are connected. Furthermore are connected to the service switching point base stations which make communication with cordless terminal units (cordless telephones) possible.

In such state-of-the-art communication systems it is possible for performance features such as call diversion or call forwarding to be activated or de-activated respectively, in the service switching point via the corded terminal units. A subscriber who has the disposal in his office, for example, of both a corded and a cordless terminal unit, may choose by which terminal unit he wishes to take incoming calls. When he is in his own office he will take calls by the usually more comfortable corded terminal unit which has many performance features and a better transmission quality. If he leaves his office and wishes to stay within reach, the subscriber will take along his terminal unit and set up a call diversion or call forwarding to his cordless terminal unit in the service switching point via the corded terminal unit, in order to be able to receive calls and communicate via this cordless terminal unit. After returning to his office, the subscriber again de-activates the call diversion or call forwarding. In the case of call diversion, incoming calls are directly diverted to the appropriate terminal unit by the service switching point. In the case of call forwarding, an incoming call is diverted only if the incoming call has not been taken by that particular subscriber in a given period of time.

SUMMARY OF THE INVENTION

It is an object of the invention to render the communication system of the type defined in the opening paragraph more comfortable to the subscriber.

The object is achieved in that a call is automatically diverted or forwarded from the corded to the cordless terminal unit once a cordless terminal unit has been removed from a dedicated support.

If the subscriber who utilizes the corded and the cordless terminal units leaves his office while taking along the cordless terminal unit, it may happen that this subscriber inadvertently does not manually activate the call diversion or call forwarding to his cordless terminal unit. Consequently, during the time of his absence, he cannot be reached via his cordless terminal unit which he originally intended to. The invention provides for this case that the call diversion or call forwarding and thus the subscriber's accessibility is ensured even without a manual activation of the call diversion or call forwarding, so that the communication system according to the invention is more comfortable to the user than systems customary thus far.

In an embodiment of the invention the corded terminal unit comprises means for receiving a detector signal generated because the cordless terminal unit has been removed from its support, and means for converting this detector signal to activate the call diversion or call forwarding.

The call diversion or call forwarding can thus be realised in a simple manner. In contemporary terminal units of, for example, private branch exchanges, an already available terminal can be used for receiving the detector signal. To convert the detector signal in accordance with the invention, it is sufficient to carry out a simple program change for a microprocessor used in the corded terminal unit.

In another embodiment, the cordless terminal unit sends a control signal to a base station once the cordless terminal unit has been removed from its support, and the base station activates the call diversion or call forwarding in response to this control signal.

In that case, the circuitry for the use according to the invention of the automatic call diversion or call forwarding is, in essence, restricted to simple detecting means for detecting the removal of the cordless terminal unit from its support and to a simple reprogramming of the cordless terminal unit, so that the cordless terminal unit sends the appropriate control signal to the base station once the cordless terminal unit has been removed.

In a further advantageous embodiment, an automatic handover from the corded to the cordless terminal unit takes place when the cordless terminal unit is removed from its support during a call.

This makes it possible for the user of the two terminal units, even during a communication, such as, for example, a telephone call made by the corded terminal unit, to effect a shift to the cordless terminal unit (handover), without the need to take further measures than lifting the cordless terminal unit from its support. In this manner the running conversation can be carried on in another office without an interruption.

These and other aspects of the invention will be apparent from and elucidated with reference to the embodiments described hereinafter.

DETAILED DESCRIPTION OF THE PREFERRED EMBODIMENT

Figure 1:
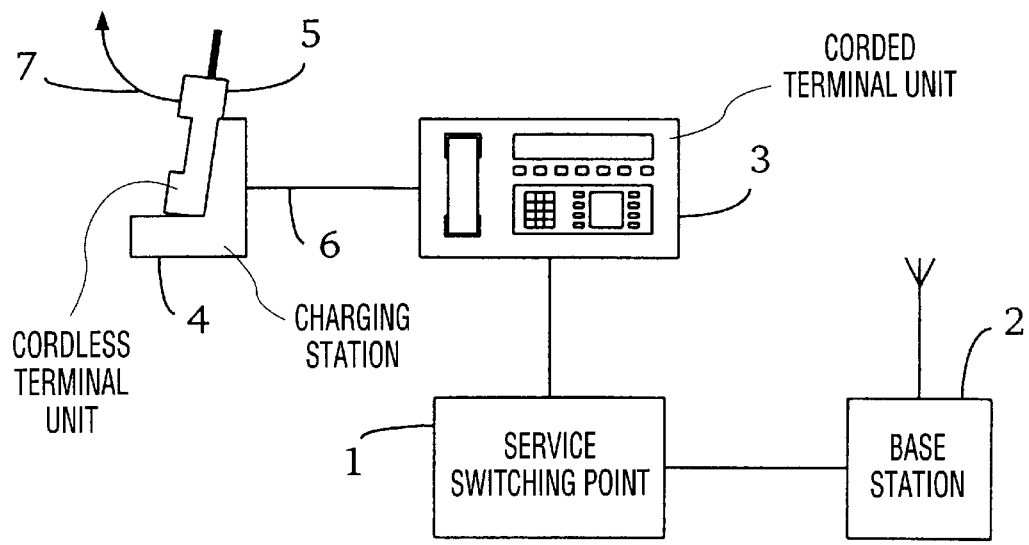
FIG. 1 shows a communication system according to the invention.

The communication system shown in FIG. 1 comprises a service switching point 1 to which are connected a base station 2 and a corded terminal unit 3. The connection to the service switching point 1 is effected, for example, in digital private branch exchanges, by an $S_o$ bus. The corded terminal unit 3 is connected by a cable to a charging station 4 which is used as a support for a cordless terminal unit 5. In the position of the cordless terminal unit 5 resting on the charging station 4, the accumulator unit of the cordless terminal unit is charged by the charging station 4.

Both the corded terminal unit 3, notably a special-feature telephone, and the cordless terminal unit 5, notably a cordless telephone, are provided to be used by a single user. If the user is in his own office, he will prefer utilizing the corded terminal unit installed there, which is customarily more comfortable than the cordless terminal unit. Incoming calls from the service switching point are in that case transferred to the corded terminal unit 3. If the user leaves his office and nevertheless wishes to stay within reach, he will take along the cordless terminal unit to be able to take calls. When the cordless terminal unit 5 is removed from its dedicated charging station 4, which is indicated by an arrow 7, the charging station 4 transmits a detector signal to the corded terminal unit 3 by the cable 6. The removal of the cordless terminal unit 5 is detected, for example, by a contact or charging current sensor arranged in the charging station 4. The corded terminal unit 3 is programmed in such a way that it automatically activates in the service switching point 1 a call diversion to the cordless terminal unit 5 in that it transforms the detector signal into a call diversion activating signal. In the ISDN (Integrated Services Digital Network) the activation is effected, for example, according to the 12 TR7 (DKZE) protocol. Incoming calls for the users are now forwarded to the cordless terminal unit 5 via the base station 2. Communications are now exchanged with the user via the cordless terminal unit 5 and the base station 2 which is coupled to the service switching point by a cable. After the user has returned to his own office, he will put the cordless terminal unit 5 back on the charging station 4, so that the call diversion is automatically de-activated by a de-activating signal. The call diversion is de-activated similarly to the activation of the call diversion. In other embodiments the call diversion is de-activated manually in lieu of automatically, for example, in that an appropriate key on the cordless terminal unit 5 or also on the corded terminal unit 3 is activated.

Figure 2:
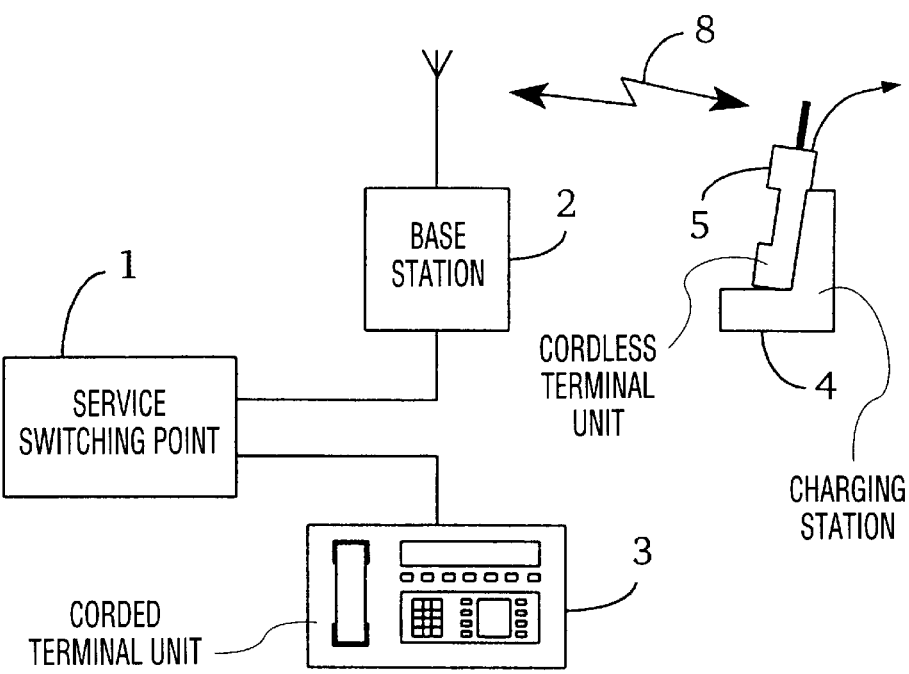
FIG. 2 shows a further embodiment for the communication system according to the invention.

In FIG. 2 is shown another embodiment for the communication system according to the invention. In contrast to FIG. 1, the charging station 4 is not connected to the corded terminal unit 3 via a cable which is used for transmitting a detector signal. In this case the cordless terminal unit 5 itself has a contact sensor, or charging current sensor, which senses whether the cordless terminal unit 5 is placed on the charging station 4 or is removed therefrom. Once the cordless terminal unit 5 has been removed from the charging station 4, the former sends a control signal to the base station 2 via the radio path. The radio path is indicated by the double arrow 8. The base station 2 converts this received control signal into an appropriate call diversion activating signal to the service switching point 1, so that the call diversion from the corded terminal unit 3 to the cordless terminal unit 5 is automatically activated in the service switching point 1. The transmission of the control signal from the cordless terminal unit 5 to the base station 2 in digital private branch exchanges is again effected according to said ISDN protocol 12 TR7 (DKZE). When, at a later stage, the cordless terminal unit 5 is put back on the charging station 4, the call diversion is analogously de-activated in that a control signal is transmitted to the base station 2.

Both in the communication system shown in FIG. 1 and in the communication system shown in FIG. 2, a call forwarding facility may be included in lieu of the call diversion facility.

If the user removes the cordless terminal unit 5 from the charging station 4 during a running conversation via the corded terminal unit 3, he effects an automatic handover i.e. an automatic switchover from the corded terminal unit 3 to the cordless terminal unit 5 analogously to the explanations given with respect to FIG. 1 or FIG. 2.

Figure 3:
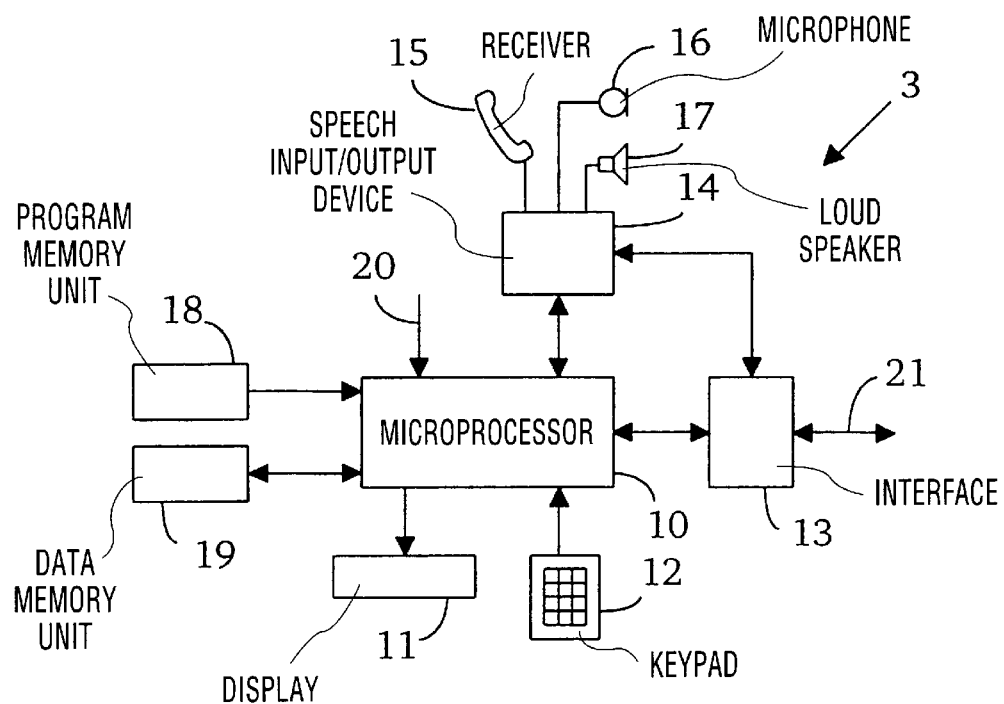
FIG. 3 shows a block diagram of a corded terminal unit of the communication system.

FIG. 3 shows a block diagram of the corded terminal unit 3 (corded telephone). It comprises a microprocessor 10, a display 11, a keypad 12, an interface 13, a speech input/output device 14 to which are connected a receiver 15, a microphone 16 and a loudspeaker 17, a program memory unit 18 as well as a data memory unit 19. The microprocessor 10 is the central controller and processing unit of the corded terminal unit 3. The microprocessor runs on a program loaded in the program memory unit 18. Data to be processed can be loaded in the data memory unit or read out respectively, by the microprocessor 10. Data or speech signals are exchanged bidirectionally with the service switching point 1 via the interface 13 coupled to the microprocessor 10 and the speech input/output device 14, which operation is indicated by the double arrow 21. The speech input/output device 14, which also has a bidirectional connection to the microprocessor 10, is used for processing speech signals which are received or transmitted via the telephone receiver 15 or the microphone 16 and the loudspeaker 17 respectively, which are integrated into a hands-free facility.

If the call diversion is activated or de-activated automatically according to FIG. 1, detector signals are received through the input 20 of the microprocessor 10 which is coupled to the charging station 4 via cable 6, which signals inform the microprocessor 10 of the fact that the cordless terminal unit 5 rests on the charging station 4, or is removed therefrom. The program stored in the program memory unit 18 is structured such that the microprocessor 10 activates or de-activates respectively, the automatic call diversion in response to the detector signal available on the input 20, or an automatic handover via the interface 13 in the service switching point 1 during a communication (conversation). The keypad 12 is instrumental in programming the cordless terminal unit 5 as a destination of a call diversion, which operation is equivalent to storing corresponding information in the data memory unit 19.

For the case where the automatic call diversion is not activated or deactivated via the corded terminal unit 3 as shown in FIG. 1, but via the cordless terminal unit 5 as shown in FIG. 2, the input 20 of the microprocessor 10 is not used, or is programmed for other purposes.

Figure 4:
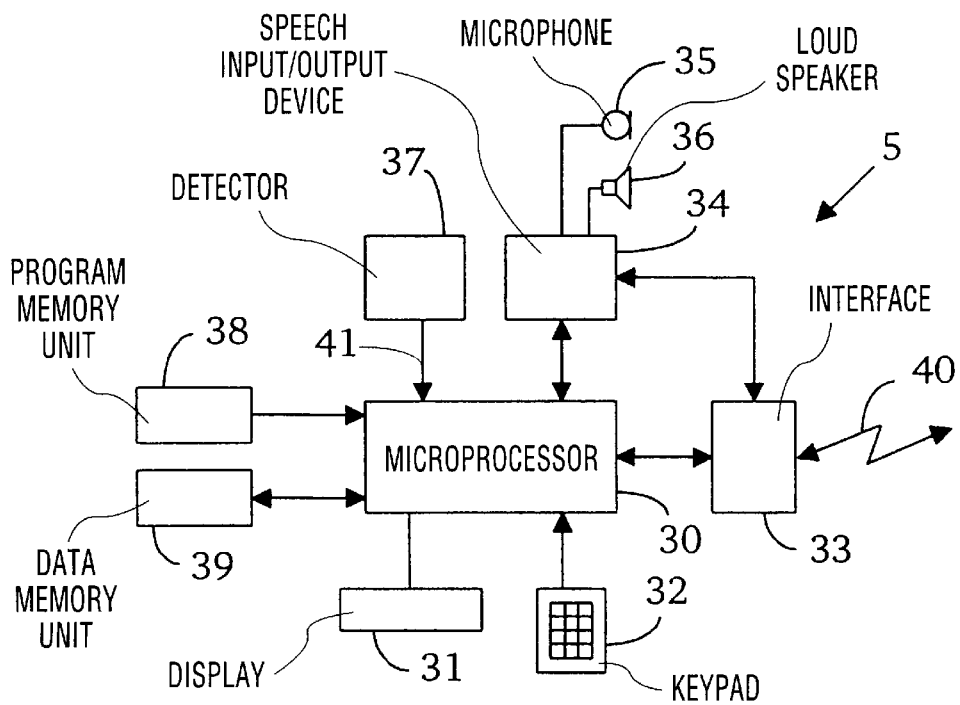
FIG. 4 shows a block diagram of a cordless terminal unit of the communication system.

FIG. 4 shows a block diagram of the cordless terminal unit 5. It comprises a microprocessor 30, a display unit 31, a keypad 32, an interface 33, a speech input/output device 34 to which a microphone 35 and a loudspeaker 36 are connected. If there is an automatic call diversion or handover as shown in FIG. 2, a detector 37 is included. Furthermore, the cordless terminal unit S contains a program memory unit 38 and a data memory unit 39. The interface 33 is an air interface which establishes on the outside a connection to the base station 2 via the radio path which is indicated by the double arrow 40. The detector 37 is arranged as a contact or charging current sensor. This detector applies a detector signal, which contains information about the cordless terminal unit 5 being removed or not from the charging station 4, to the input 41 of the microprocessor 30. This signal is processed by the microprocessor 30, so that a control signal is transmitted to the base station 2 via the interface 33, which base station in its turn activates the call diversion or handover respectively, in the service switching point 1 when the cordless terminal unit 5 is removed from the charging station 4. If, at a later stage, the cordless terminal unit 5 is placed back on the charging station 4, this automatically de-activates the call diversion or handover respectively, in analogous manner.

The automatic activating or de-activating of the call diversion as shown in FIG. 2 may be implemented, provided that minor modifications of the microprocessor 30 program stored in the program memory 38 are made. The origin of the call diversion i.e. the address or telephone number of the corded terminal unit 3 can be programmed and stored in the data memory 39 via the keypad 32.

When the call diversion is activated automatically via the corded terminal unit 3 as shown in FIG. 1, no modification of the program stored in the program memory unit 38 of the cordless terminal unit 5 is needed and neither is a detector 37. The input 41 of the microprocessor 30 is then not used or used for other purposes.

Figure 5:
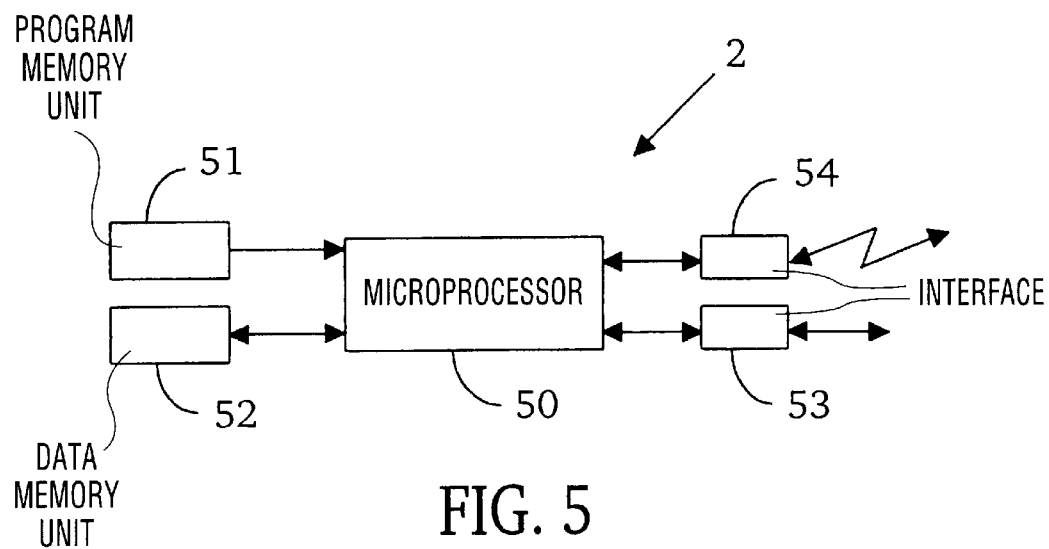
FIG. 5 shows a block diagram of a base station of the communication system.

FIG. 5 shows a block diagram of the base station 2 shown in FIGS. 1 and 2. This base station comprises, in essence, a microprocessor 50, a program memory unit 51, a data memory unit 52, an interface 53 and an interface 54. The program according to which the base station 2 further processes data is stored in the program memory unit 51. The data memory 52 contains data which are read by the microprocessor 50, or which have been stored therein by the microprocessor 50. The microprocessor 50 is coupled via the interface 53, for example, via an $S_o$ bus, to the service switching point 1. Via the interface 54 the microprocessor 50 is coupled to the cordless terminal unit 5 via the radio path. The base station performs, as required, a format transformation of the messages to be transmitted from interface 3 to interface 4 and vice versa. For the case of an automatic call diversion as shown in FIG. 2, it is necessary for the program stored in the program memory unit 51 to be modified. In the case of the automatic call diversion shown in FIG. 1, no modifications of the program in the base station 2 are necessary.

The annexes 1 to 4 show program runs of the communication system according to the invention for the service switching point 1, the corded terminal unit 3, the cordless terminal unit 5 and for the base station 2.

The program runs shown in the annexes are combined in program modules whose call is always accompanied by a change of state of the service switching point 1, of the corded terminal unit 3, of the cordless terminal unit 5 or of the base station 2. Jumping from one module to the next is possible. The reference characters used correspond to those in the described Figures. The call diversion mentioned is always a call diversion from the corded terminal unit 3 to the cordless terminal unit 5. The program runs mentioned include only the program components essential to the invention, which components will be explained hereinafter.

With respect to the program runs in the service switching point 1 which are described in annex 1, the following is observed:

If the program module "state of rest" is invoked, the service switching point 1 changes to the state of rest, in other words, it is de-activated in respect of the corded terminal unit 3 and the cordless terminal unit 5. Then there is enquired whether a call for the corded terminal unit 3 has been received in the service switching point. If this first condition is satisfied, a call is sent to the corded terminal unit 3 and then the instruction to jump to the program module "state of call for 3" is followed. The instructions assigned to a condition enquiry and following the condition enquiry are indented in the present program modules. If the first condition enquiry gets a negative response, said jump is not carried out and there is enquired whether the service switching point 1 has received the activating signal for the call diversion from the corded terminal unit 3 to the cordless terminal unit 5. If this second condition is satisfied, the call diversion is activated in the service switching point 1 and, furthermore, a jump is made to the module "state of rest with call diversion". If also the second condition enquiry obtains a negative response, the service switching point 1 continues to be in its state of rest. The two conditions are then enquired cyclically until the "state of rest" module is left. This procedure analogously holds for all the subsequent program modules.

In the program module "state of call for 3" there is first enquired whether the activating signal for the call diversion has been received. If this first condition is satisfied, the call diversion in the service switching point 1 is activated. Then the call to the corded terminal unit 3 is taken back and a call is sent to the cordless terminal unit 5. Furthermore, a jump is made to the program module "state of call for 5". Thereafter, there is enquired whether the corded terminal unit 3 responds to this call. If this is the case, a jump to the program module "state of call with 3" is made.

In the program module "state of rest with call diversion", two condition enquiries are provided. First there is enquired whether a call has been received for the corded terminal unit 3. If this is confirmed, a call is sent to the cordless terminal unit 5 and a jump is made to the program module "state of call for 5". In a second condition enquiry there is determined whether a call diversion de-activating signal has been received. If this is the case, the call diversion is de-activated and a jump is made to the program module "state of rest".

In the program module "state of call with 3", the service switching point 1 has established a telephone communication between the corded terminal unit 3 and another subscriber. If in this state the activating signal for activating the call diversion from the corded terminal unit 3 to the cordless terminal unit 5 is received, the call diversion is activated in the service switching point 1 and, furthermore, a jump is made to the program module "state of call with 3 with call diversion". If, during the call, the service switching point 1 receives a signal for a handover from the corded terminal unit 3 to the cordless terminal unit 5, in other words, when the cordless terminal unit 5 is removed from the charging station 4, a handover from the corded terminal unit 3 to the cordless terminal unit 5 is activated in the service switching point 1 and a jump is made to the program module "state of call for 5". If a call termination signal is received in the service switching point 1, for example if the user of the corded terminal unit puts down the receiver to end the call, the corded terminal unit 3 is disconnected from the subscriber communicating with him and a jump to the program module "state of rest" is made. Furthermore, the call diversion is deactivated.

In the program module "state of call for 5", the service switching point 1 sends a call to the cordless terminal unit 5. If a de-activating signal for the call diversion is received, the call diversion activated in this state of the service switching point 1 is deactivated, the call to the cordless terminal unit 5 is taken back, a call is sent to the corded terminal unit 3 and a jump is made to the program module "state of call for 3". If in this state an activating signal for the call diversion is received together with the call for the cordless terminal unit 5, the call diversion is activated. If the cordless terminal unit 5 sends a response signal when it receives the call, in other words, if the user of the cordless terminal unit 5 takes the call, a jump is made to the program module "state of call with 5". If the call for the cordless terminal unit 5 is taken back, a jump is made to the program module "state of rest with call diversion".

If the program module "state of call with 3 with call diversion" is invoked, it is a case of the call diversion being activated during a conversation of a subscriber with the corded terminal unit 3. This does not automatically result in a handover. If the service switching point 1 receives a signal for a handover from the corded terminal unit 3 to the cordless terminal unit 5, a handover takes place from the corded terminal unit 3 to the cordless terminal unit 5 that is, in lieu of the call from the corded terminal unit 3 to another subscriber, a call is made from the cordless terminal unit 5 to this other subscriber. Furthermore, a jump is made to the program module "state of call for 5". Furthermore, there is enquired whether a call termination signal was received, which is sent when either subscriber wishes to end the call. In that case, the service switching point 1 disconnects the corded terminal unit 3 from the other subscriber and, furthermore, a jump is made to the program module "state of rest with call diversion". If in the present program module or state of the service switching point 1 a call diversion de-activating signal is received, the service switching point 1 de-activates the call diversion from the corded terminal unit 3 to the cordless terminal unit 5 and a jump is made to the program module "state of call with 3".

In the program module "state of call with 5", the cordless terminal unit 5 is connected to another subscriber for a communication exchange. For the case where a call termination signal is received, for example, if either subscriber puts down his telephone receiver or depresses a key to terminate the call, the connection between the cordless terminal unit 5 and the other subscriber is terminated in the service switching point 1 and a jump is made to the program module "state of rest with call diversion". In the present program module or state of the service switching point 1, a call diversion from the corded terminal unit 3 to the cordless terminal unit 5 is activated. In the case where a de-activating signal for de-activating the call diversion is received from the service switching point 1, this service switching point 1 introduces the de-activation of the call diversion and a jump is made to the program module "state of call with 5 without call diversion".

The program module shown last for the service switching point 1 reads "state of call with 5 without call diversion". This program module is jumped to if the call diversion from the corded terminal unit 3 to the cordless terminal unit 5 is de-activated while a call is taking place with the cordless terminal unit 5. If in this program module or state of the service switching point 1 a call termination signal is received from the service switching point 1, the call is terminated by the service switching point 1 and a jump is made to the program module "state of rest". If the service switching point 1 receives a call diversion activating signal, the service switching point 1 activates the call diversion and a jump is made to the program module "state of call with 5".

As regards the program runs in the corded terminal unit 3 described in annex 2 the following may be observed:

The program modules of annex 2 relate to the call diversion being activated, in which the corded terminal unit 3 is used for transforming a detector signal generated by the charging station 4 into a call diversion activate signal applied to the service switching point 1 (see FIG. 1 with associated description).

If in the state of rest of the corded terminal unit 3 the cordless terminal unit 5 is removed from the charging station 4, the corded terminal unit 3 sends an activating signal for the call diversion to the service switching point 1. The corded terminal unit 3 is informed of the removal of the cordless terminal unit 5 from its charging station 4 via the detector signal transmitted by a cable. After the activating signal has been sent, a jump is made to the program module "state of rest with 5 removed from 4". Furthermore, while in the state of rest, there is enquired whether a call was received at the corded terminal unit 3. If this is the case, a ringing tone is produced via the loudspeaker 17 and a jump is made to the program module "signalling".

In the program module "state of rest with 5 removed from 4", the call diversion from the corded terminal unit 3 to the cordless terminal unit 5 is activated. If in this state the cordless terminal unit 5 is put on its charging station 4, the corded terminal unit 3 sends a de-activating signal for call diversion de-activation to the service switching point 1 and a jump is made to the program module "state of rest".

In the program module or "signalling" state respectively, the incoming call is signalled to the user. A loudspeaker then produces a ringing tone. If in this state the call to the corded terminal unit 3 is taken back, a jump is made to the program module "state of rest". If the corded terminal unit 3 takes a call, the service switching point 1 is informed thereof and a jump is made to the program module "calling state". If during the signalling state the cordless terminal unit 5 is removed from the charging station 4, the corded terminal unit 3 sends a call diversion activating signal to the service switching point 1 and, furthermore, a jump is made to the program module "state of rest with 5 removed from 4".

In the calling state or in the "calling state" program module respectively, a call from the corded terminal unit 3 to another subscriber communicating with this terminal unit is switched through via the service switching point 1. If in this state a call termination signal is received, for example, if either subscriber puts down the receiver or depresses a call termination key, the call is terminated and a jump is made to the program module "state of rest". If in the calling state the cordless terminal unit 5 is removed from the charging station 4, a call diversion activating signal is sent to the service switching point 1, a signal for a handover from the corded terminal unit 3 to the cordless terminal unit 5 is sent to the service switching point 1, and a jump is made to the program module "state of rest with 5 removed from 4".

As regards the program runs in the cordless terminal unit 5 described in annex 3, the following may be stated:

The call diversion is activated if the program runs of annex 3 take place via the cordless terminal unit 5 and the base station 2 to be further described in annex 3 (see FIG. 2 with associated description).

In the program module "state of rest with 5 resting on 4", the cordless terminal unit 5 is in a state of rest and the call diversion to this terminal unit is not activated. If the cordless terminal unit 5 is removed from its charging station 4, this terminal unit 5 sends a control signal to the base station 2 via the radio path, which base station 2 converts the control signal into a call diversion activating signal for the service switching point 1, where the call diversion is activated. Furthermore, if the cordless terminal unit 5 is removed from its charging station 4, a jump is made to the program module "state of rest with 5 removed from 4".

In the program module "state of rest with 5 removed from 4" the call diversion is activated. If the cordless terminal unit 5 removed from the charging station 4 is put back on the charging station 4, a control signal for de-activating the call diversion is sent to the base station 2 and a jump is made to the program module "state of rest with 5 resting on 4" is made. If the cordless terminal unit 5 receives a call, its loudspeaker 36 will produce a ringing tone and a jump will be made to the program module "signalling".

In the program module "signalling", the incoming call is signalled to the user. If there is no more call available at the cordless terminal unit 5, the program module "state of rest with 5 removed from 4" is jumped to. If a user of the cordless terminal unit 5 takes a call, the service switching point 1 is informed thereof and a jump is made to the program module "call state".

In the program module "call state", a connection between the cordless terminal unit 5 and another subscriber is switched through via the base station 2 and the service switching point 1. If in this state a call termination signal is received, for example if the user of the cordless terminal unit 5 depresses the call termination key, the connection is terminated and a jump is made to the program module "state of rest with 5 removed from 4". For the case where the cordless terminal unit 5 is placed on the charging station 4, a control signal for de-activating the call diversion is sent to the base station, the call is terminated and a jump is made to the program module "state of rest with 5 placed on 4".

As regards the program run in the base station 2 described in annex 4, the following may be observed:

The defined program run relates, as do the program runs in annex 3, to a call diversion activated via the cordless terminal unit 5 and the base station 2.

Only a single program module is defined, which will be sufficient for explaining the invention and describes runs during a state of the base station 2 referenced here as "basic state". If in this state of the base station 2 a control signal for activating the call diversion is received from the cordless terminal unit 5 via the interface 54, an activating signal for activating the call diversion is sent by the base station 2 to the service switching point 1 via the interface 53. If the base station 2 receives from the cordless terminal unit 5 via the interface 54 a control signal for de-activating the call diversion, the base station 2 sends a de-activation signal for de-activating the call diversion to the service switching point 1 via the interface 53. If a call termination signal is received via interface 53 or interface 54, the base station 2 terminates the connection to the cordless terminal unit 5.

Annex 1:
Program runs in the service switching point 1:
State of rest:
If: Call for 3 received;
   Send call to 3;
   Jump to: state of call for 3;
If: Call diversion activating signal received;
   Activate call diversion;
   Jump to: State of rest with call diversion;
State of call for 3:
If: Call diversion activating signal received;
   Activate call diversion;
   Take back call for 3;
   Send call to 5;
   Jump to: State of call for 5;
If: 3 responds
   Jump to: State of call with 3;
State of rest with call diversion:
If: Call for 3 received;
   Send call to 5;
   Jump to: State of call for 5;
If: Call diversion de-activating signal received;
   De-activate call diversion;
   Jump to: State of rest;
State of call with 3:
If: Call diversion activating signal received;
   Activate call diversion;
   Jump to: State of call with 3 with call diversion;
   Activate handover from 3 to 5;
   Jump to: State of call for 5;
If: Call terminating signal received
   Disconnect;
   Jump to: State of rest;
If: Call diversion de-activating signal received;
   De-activate call diversion;
   Jump to: State of call with 3;
State of call for 5:
If: Call diversion de-activating signal received;
   De-activate call diversion;
   Take back call for 5;
   Send call to 3;
   Jump to: State of call for 3;
If: Call diversion activating signal received;
   Activate call diversion;
   Jump to: State of call for 5;
If: 5 responds;
   Jump to: State of call with 5;
If: Call for 5 is taken back;
   Jump to: State of rest with call diversion;
State of call with 3 with call diversion:
If: Signal for handover from 3 to 5 received;
   Activate handover from 3 to 5;
   Jump to: State of call for 5;
If: Connection terminating signal received;
   Disconnect;
   Jump to: State of rest with call diversion;
If: Call diversion de-activating signal received;
   De-activate call diversion;
   Jump to: State of call with 3;
State of call with 5:
If: Call terminating signal received;
   Disconnect;
   Jump to: State of rest with call diversion;
If: Call diversion de-activating signal received;
   De-activate call diversion;
   Jump to: State of call with 5 without call diversion;
State of call with 5 without call diversion:
If: Connection terminating signal received;
   Disconnect;
   Jump to: State of rest;
If: Call diversion activating signal received;
   Activate call diversion;
   Jump to: State of call with 5;
Annex 2:
Program runs in the corded terminal unit 3 (activation of the call diversion via the charging station 4 and the corded terminal unit 3):
State of rest:
If: 5 is removed from 4;
   Send call diversion activating signal to 1;
   Jump to: State of rest with 5 removed from 4;
If: Call to 3 received;
   Produce ringing tone via loudspeaker 17;
   Jump to: Signalling;
State of rest with 5 removed from 4:
If: 5 placed on 4;
   Send call diversion de-activating signal to 1;
   Jump to: State of rest;
Signalling:
If: Call to 3 is taken back;
   Jump to: State of rest;

```
If: Call taken by 3;
   Send signal for call taken by 3 to 1;
   Jump to: Call state;
If: 5 removed from 4;
   Send call diversion activating signal to 1;
   Jump to: State of rest with 5 removed from 4;
Call state:
If: Call terminating signal received;
   Disconnect;
   Jump to: State of rest;
If: 5 removed from 4;
   Send call diversion activating signal to 1;
   Send signal for handover from 3 to 5 to 1;
   Jump to: State of rest with 5 removed from 4;
Annex 3:
Program runs in the cordless terminal unit 5 (activation of the call diversion via the cordless terminal unit 5 and the base station 2):
State of rest with 5 placed on 4:
If: 5 removed from 4;
   Send control signal for call diversion to 2;
   Jump to: State of rest with 5 removed from 4;
State of rest with 5 removed from 4:
If: 5 placed on 4;
   Send control signal for call diversion de-activation to 2;
   Jump to: State of rest with 5 placed on 4;
If: Call to 5 received;
   Produce ringing tone via loudspeaker 36;
   Jump to: Signalling;
Signalling:
If: Call is taken back at 5;
   Jump to: State of rest with 5 removed from 4;
If: Call taken by 5;
   Send signal for call taken by 5 to 1;
   Jump to: Calling state;
Call state:
If: Terminating signal received;
   Disconnect;
   Jump to: State of rest with 5 removed from 4;
If: 5 placed on 4;
   Send control signal for call diversion de-activation to 2;
   Disconnect:
   Jump to: State of rest with 5 placed on 4;
Annex 4:
Program runs in the base station 2 (activation of the call diversion via the cordless terminal unit 5 and the base station 2):
Basic state:
If: Control signal for call diversion activation received via interface 54;
   Send call diversion activating signal via interface 53 to 1;
If: Control signal for call diversion de-activation received via interface 54;
   Send call diversion de-activating signal via interface 53 to 1;
If: Connection terminating signal received;
   Disconnect.
```

What is claimed is:

1. A communication system comprising:

service switching point;

a base station communicatively connected to said service switching point;

a cordless terminal unit including a handset and a charging station; and at least one corded terminal unit, including a corded handset, communicatively connected to said service switching point, wherein a call is diverted or forwarded from said corded terminal unit to said cordless terminal unit once said cordless terminal unit has been removed from the charging station, wherein a signal indicative of the removal of said cordless terminal unit from the charging station is detected by said corded terminal unit and is transmitted to said service switching point, wherein said cordless terminal unit sends a control signal to said base station once said cordless terminal unit has been removed from the charging unit, and wherein said base station activates the call diversion or call forwarding in response to the control signal so that the call is diverted or forwarded to said cordless terminal unit via said base station.

2. The communication system as claimed in claim 1, wherein said corded terminal unit comprises means for receiving a detector signal, wherein the detector signal is generated when said cordless terminal unit has been removed from the dedicated support and means for converting the detector signal to activate the call diversion or call forwarding.

3. The communication system as claimed in claim 1, wherein an automatic handover from said corded terminal unit to said cordless terminal unit takes place when said cordless terminal unit is removed from the dedicated support during a communication.

4. The communication system as claimed in claim 2, wherein an automatic handover from said corded terminal unit to said cordless terminal unit takes place when said cordless terminal unit is removed from the dedicated support during a communication.

5. The communication system as claimed in claim 1, wherein an automatic handover from said corded terminal unit to said cordless terminal unit takes place when said cordless terminal unit is removed from the dedicated support during a communication.

6. The communication system according to claim 1, wherein said cordless terminal unit is communicatively connected to said corded terminal unit through a wireless link.

7. The communication system according to claim 1, wherein said cordless terminal unit is communicatively connected to said base station through a wireless link.

* * * * *